US006502073B1

(12) United States Patent
Guan et al.

(10) Patent No.: US 6,502,073 B1
(45) Date of Patent: Dec. 31, 2002

(54) LOW DATA TRANSMISSION RATE AND INTELLIGIBLE SPEECH COMMUNICATION

(75) Inventors: Cuntai Guan, Singapore (SG); Jun Xu, Singapore (SG); Haizhou Li, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/462,799

(22) PCT Filed: Mar. 25, 1999

(86) PCT No.: PCT/SG99/00021

§ 371 (c)(1),
(2), (4) Date: Jan. 7, 2000

(87) PCT Pub. No.: WO00/58949

PCT Pub. Date: Oct. 5, 2000

(51) Int. Cl.$^{7}$ ........................ G10L 15/28; G10L 15/26; G10L 15/08; G10L 13/06

(52) U.S. Cl. ........................ 704/255; 704/235; 704/236; 704/260; 704/266

(58) Field of Search ........................ 704/256, 251–257, 704/500, 501, 503, 1–8, 10, 276; 341/28

(56) References Cited

U.S. PATENT DOCUMENTS 4,661,915 A 4/1987 Ott
4,870,402 A * 9/1989 DeLuca et al. ................ 704/8
4,884,972 A * 12/1989 Gasper ........................ 704/276
4,975,957 A 12/1990 Ichikawa et al.
5,410,306 A 4/1995 Ye .............................. 341/28
5,497,319 A * 3/1996 Chong et al. ................. 704/10
5,822,720 A * 10/1998 Bookman et al. .............. 704/3
6,292,768 B1 * 9/2001 Chan ............................ 704/1

FOREIGN PATENT DOCUMENTS

EP 0271619 6/1988
EP 0463692 9/1995
JP 8305542 11/1996

OTHER PUBLICATIONS

Hynds et al ("Atrisco Well #5: A Case Study of Failure in Professional Communication", IEEE Transactions on Professional Communication, Sep. 1995).*
Y. M. Cheng et al., "A 450 BPS Vocoder With Natural Sounding Speech, " IEEE ICASSP 98, pp 649–652, 1990.
Keiichi Tokuda et al., "A Very Low Bit Rate Speech Coder Using HMM–Based Speech Recognition/ Synthesis Techniques," IEEE ICASSP 98, pp 609–612, 1998.

* cited by examiner

*Primary Examiner*—Richemond Dorvil
*Assistant Examiner*—Daniel Nolan
(74) *Attorney, Agent, or Firm*—Nath & Associates PLLC; Harold L. Novick; Marvin C. Berkowitz

(57) ABSTRACT

A method of processing speech representative of ideograms for speech communication using an asynchronous communication channel (21) is disclosed. The method includes the step of processing speech units of a speech and data indicative of the speech units. Each speech unit is representative of an ideogram or a plurality of semantically related ideograms (500–508). The data indicative of the speech units is discretely communicable on the asynchronous communication channel (21). By communicating the data indicative of the speech units, a substantially low data transmission rate and intelligible speech communication is achieved.

40 Claims, 6 Drawing Sheets

LOW DATA TRANSMISSION RATE AND INTELLIGIBLE SPEECH COMMUNICATION

FIELD OF THE INVENTION

The present invention relates to the field of speech communication. In particular, it relates to speech processing for speech communication so that a low data transmission rate and substantially intelligible speech communication is achieved.

BACKGROUND

The recent development of digital communication has significantly impacted the way in which people around the globe communicate. For example, the Internet explosion has changed the lives of many people, both in businesses and as consumers. To some, the Internet is a source of information. To others, the Internet is a medium for communicating sound and/or images of communicating parties. Video conferencing among multiple parties via the Internet is available. Internet telephony is also fast becoming popular.

Whichever of the above modes of communication a business or a consumer chooses to use via the Internet, voice or speech communication inevitably forms a vital component of that mode of communication. One advantage of speech communication is that it is an efficient mode of communication. That is, the communicating parties do not need to write or type to consolidate their thoughts for communication. Another advantage of speech communication is that the "voice personality" of the communicating parties can be communicated. The intonation, pitch, accent, and like qualities of a speaking party can be transmitted to a listening party to invoke a more personal ambience during the communication. Conventional speech communication schemes are not, however, without their shortfalls. These speech communication implementations via the Internet, whether in conjunction with visual communication such as video conferencing or on its own such as Internet telephony, are based on frame synchronization of communicated speech data. Speech data is obtained by processing speech suitable for communication. The Internet, however, does not provide for synchronized data communication. Hence, frames of speech data that need to be synchronously communicated are not done so on the Internet, thereby rendering the speaking party's speech to be discontinuous when the speech reaches the listening party. Discontinuously communicated speech typically contains interruptions that occur inconsistently and have varying durations. Hence, the effect of the communicated speech on the listening party is at best bothersome and at worst unintelligible. The Internet's inconsistent data transmission rates further compound this problem. At times, the data transmission rate can be lower than the acceptable threshold required for reasonably intelligible speech communication. When both problems occur, the resulting effect causes speech communication to fail or become unacceptable.

The above adverse effects on speech communication differ in varying degrees for different languages. In languages comprising ideograms, for example the Chinese, Japanese and Korean languages, each spoken ideogram is monosyllabic or consists of a single phoneme. Hence, when conventional speech communication schemes are used for these languages, the resultant discontinuously communicated speech sensitizes the listening party. The intelligibility of the communicated speech for any of these languages depends heavily on the continuity of the single syllable or phoneme of each spoken monosyllabic ideogram in that language. Clearly, there exists a need for low data transmission rate and intelligible speech communication scheme for use on an asynchronous communication channel having inconsistent transmission rate.

SUMMARY

Various aspects of the invention are directed to ameliorating or overcoming one or more disadvantages of conventional speech communication schemes. In particular, the aspects of the invention are directed to addressing the disadvantages associated with conventional speech communication schemes for use on an asynchronous communication channel having inconsistent data transmission rates. Furthermore, the aspects of the invention are directed to improving speech communication for languages consisting of ideograms.

In accordance with a first aspect of the invention, there is disclosed a method of processing speech representative of ideograms for speech communication using an asynchronous communication channel. The method includes the step of processing speech units of a speech and data indicative of the speech units. Each speech unit is representative of an ideogram or a plurality of semantically related ideograms, and the data indicative of the speech units is discretely communicable on the asynchronous communication channel for providing substantially low data transmission rate and intelligible speech communication.

In accordance with a second aspect of the invention, there is disclosed a method of processing speech representative of ideograms for speech communication using an asynchronous communication channel. The method includes the steps of: processing meaning groups of a speech and data representing the meaning groups, wherein each meaning group is formed from at least one ideogram identifiable by a meaning and the data representing the meaning group is discretely communicable on the asynchronous communication channel; and processing data dependent on the speech pattern of the speech in relation to one of both of the time and frequency domains, the dependent data communicable on the asynchronous communication channel, whereby substantially low data transmission rate and intelligible speech communication is provided.

In accordance with a third aspect of the invention, there is disclosed a speech processing device, including: a speech digitizer for processing a speech in an ideographic language and digitized speech thereof, and a semantic processor for processing the digitized speech by processing speech units representative of an ideogram in the speech or a plurality of semantically related ideograms and data indicative of the speech units which are discretely communicable on an asynchronous communication channel for providing substantially low data transmission rate and intelligible speech communication.

In accordance with a fourth aspect of the invention, there is disclosed a speech communication system for an asynchronous communication channel, including: a speech processing device for processing a speech in an ideographic language and digitized speech thereof by processing speech units representative of an ideogram in the speech or a plurality of semantically related ideograms and data indicative of the speech units which are discretely communicable; and a communication controller for communicating the speech information on the asynchronous communication channel for providing substantially low data transmission rate and intelligible speech communication.

In accordance with a fifth aspect of the invention, there is disclosed a computer program product for processing speech for communication on an asynchronous communication channel, including: a computer usable medium having computer readable program code means embodied in the medium for causing the processing of speech representative of ideograms for speech communication, the computer program product having: computer readable program code means for processing speech units of a speech and data indicative of the speech units, wherein each speech unit is representative of an ideogram or a plurality of semantically related ideograms and the data indicative of the speech units is discretely communicable on the asynchronous communication channel for providing substantially low data transmission rate and intelligible speech communication.

BRIEF DESCRIPTION OF THE DRAWINGS

Embodiments of the invention are described hereinafter with reference to the drawings, in which.

DETAILED DESCRIPTION

Figure 1:
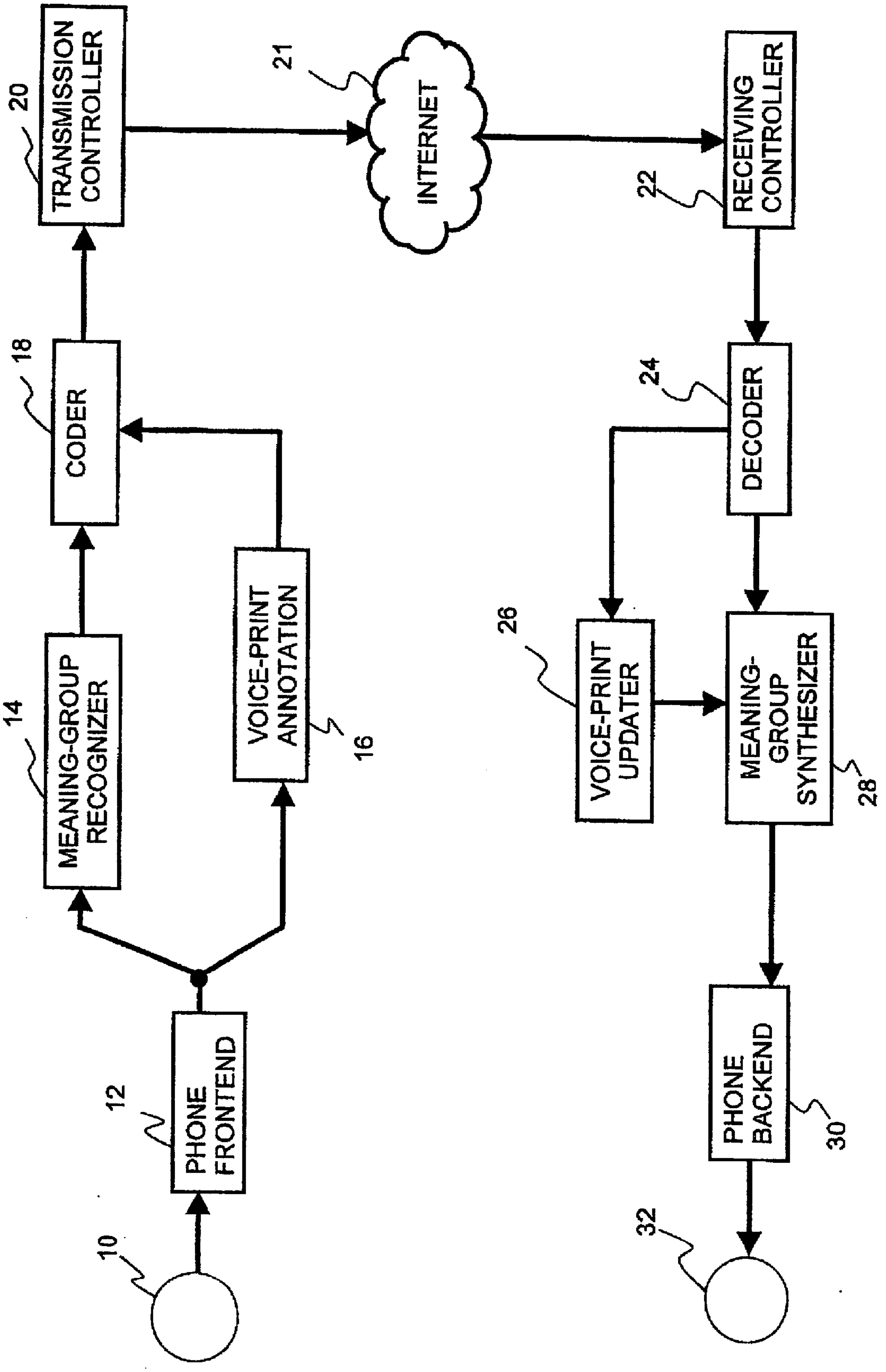
FIG. 1 is a high-level block diagram illustrating the speech communication system in accordance with a first embodiment of the invention.

A method, a device, a system and a computer program product for providing low data transmission rate and intelligible speech communication are described. In the following description of several embodiments, numerous specific details such as particular ideographic languages, transducers, filter models, and the like are described in order to provide a more thorough description of those embodiments. It will be apparent, however, to one skilled in the art that the invention may be practiced without those specific details. In other instances, well-known features such as particular communication channels (e.g. the Internet), protocols for transferring data via the Internet, and the like have not been described in detail so as not to obscure the invention.

The advantages of the embodiments of the invention are manifold. Internet telephones embodying the invention, as a result, can provide low cost telephony service in comparison with the conventional telephony services. Such Internet telephones can also provide intelligible speech, especially for ideographic languages, substantially free from unexpected interruptions due to the Internet's asynchronous transmission characteristic in contrast to conventional Internet telephones. Such unexpected interruptions include disjointed syllables or phonemes of ideograms. That is, the embodiments of the invention significantly reduce or avoid altogether discontinuities in any spoken sounds. Thus, unnatural sounds are avoided. Also, the achievable data transmission rate of the intelligible speech communication can be as low as 100 bps, a rate that is substantially lower than the typical erratic data transmission rate of the Internet, e.g. 800–1200 bps. In contrast, conventional communication systems typically require transmission bit rates greater than 1200 bps. Further, the embodiments of the invention are able to improve the quality of the communicated speech, especially for ideographic languages, incrementally and automatically. The embodiments of the invention use speech recognition and text-to-speech techniques based on meaning-groups and voice-prints. The use of meaning groups significantly increases the intelligibility of a received voice. Also, the extraction and updating of voice-prints produces synthesized speech that is more natural. These aspects contribute to the advantages of the embodiments. A meaning-group in any ideographic language is the smallest unit of speech that bears a meaning in that language and may consist of one or more ideograms. The voice print update includes one or more sound units that characterise speech in a particular language, and is used to incrementally and automatically increase the quality of synthesised speech so that it sounds more natural. As a user speaks, the updates are provided as input to a speech synthesiser and are therefore dependent upon the synthesiser. For example, the update may preferably be a speech signal encoded using Pulse Code Modulation (PCM). Alternatively, the update (in the frequency) domain may include parameters such as energy, excitation, and the like. Voice print updates are described in greater detail hereinafter.

The advantages are achieved by recognizing that semantics in relation to these languages is dependent on intelligible units of speech consisting of one or more ideograms. Therefore, the embodiments of the invention involve the use of intelligible units of speech consisting of one or more ideograms identifiable by meaning or associable by semantic.

Figure 5A:
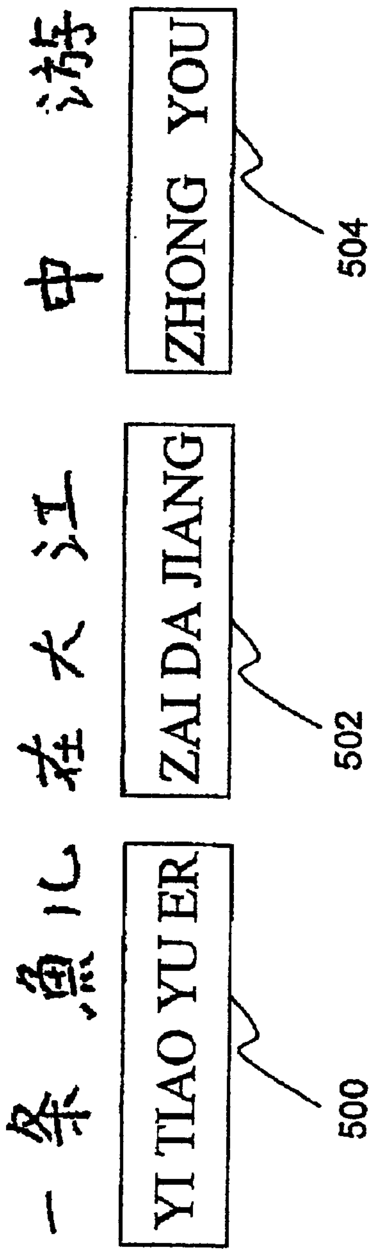
FIGS. 5A and 5B illustrate the grouping of words in a sentence in the Chinese language according to meaning-groups.
Figure 5B:
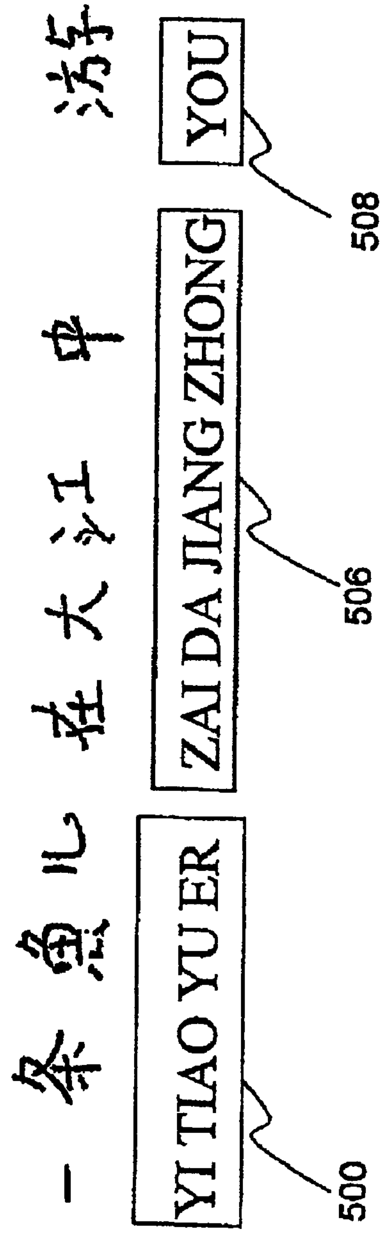

In particular, the advantage associated with achieving intelligible speech communication for ideographic languages is important because such a form of communication is gaining importance and popularity today. The processing of speech in preparation for speech communication involves meaning-groups. To provide an appreciation of the significance of meaning-groups on semantics of ideographic languages, a sentence in the Chinese language, an ideographic language, is described with reference to FIGS. 5A and 5B. FIG. 5A shows a sentence comprising contiguous words, each word being a phonetic representation of an ideogram in Chinese known as a Pinyin word. The exemplified Chinese sentence in ideographic form is also shown in FIGS. 5A and 5B. The sentence is partitioned into several groups of Pinyin words so that when read, a pause is only heard between the continuous articulation of each group of Pinyin words. A first group of Pinyin words 500 relates to "a fish" in English. A second group of Pinyin words 502 relates to "a big river". A third group of Pinyin words 504 relates to the word "middle". Collectively, the three groups of Pinyin words read as "a fish is in the middle of a big river."

The Pinyin words in the sentence shown in FIG. 5B, although appearing in the same contiguous order as shown in FIG. 5A, are grouped differently. The difference, though minute, is significant in terms of meaning. A first group of Pinyin words 506 relates to "in a big river". A second group of Pinyin words 508 relates to the word "swim". Collectively therefore, the three groups of Pinyin words read as "a fish swims in the big river."

Hence, the significance of meaning groups in sentences of an ideographic language in the translation of meaning, especially when articulated, can be seen from the above exemplification. Even small delays due to the inconsistent transmission rates of asynchronous communication channels such as the Internet can potentially significantly affect the intelligibility and meaning of speech based on ideographic languages.

Communication System

In the description provided hereinafter, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art would be able to appreciate that the system can also be implemented as a combination of hardware and software modules.

Figure 2:
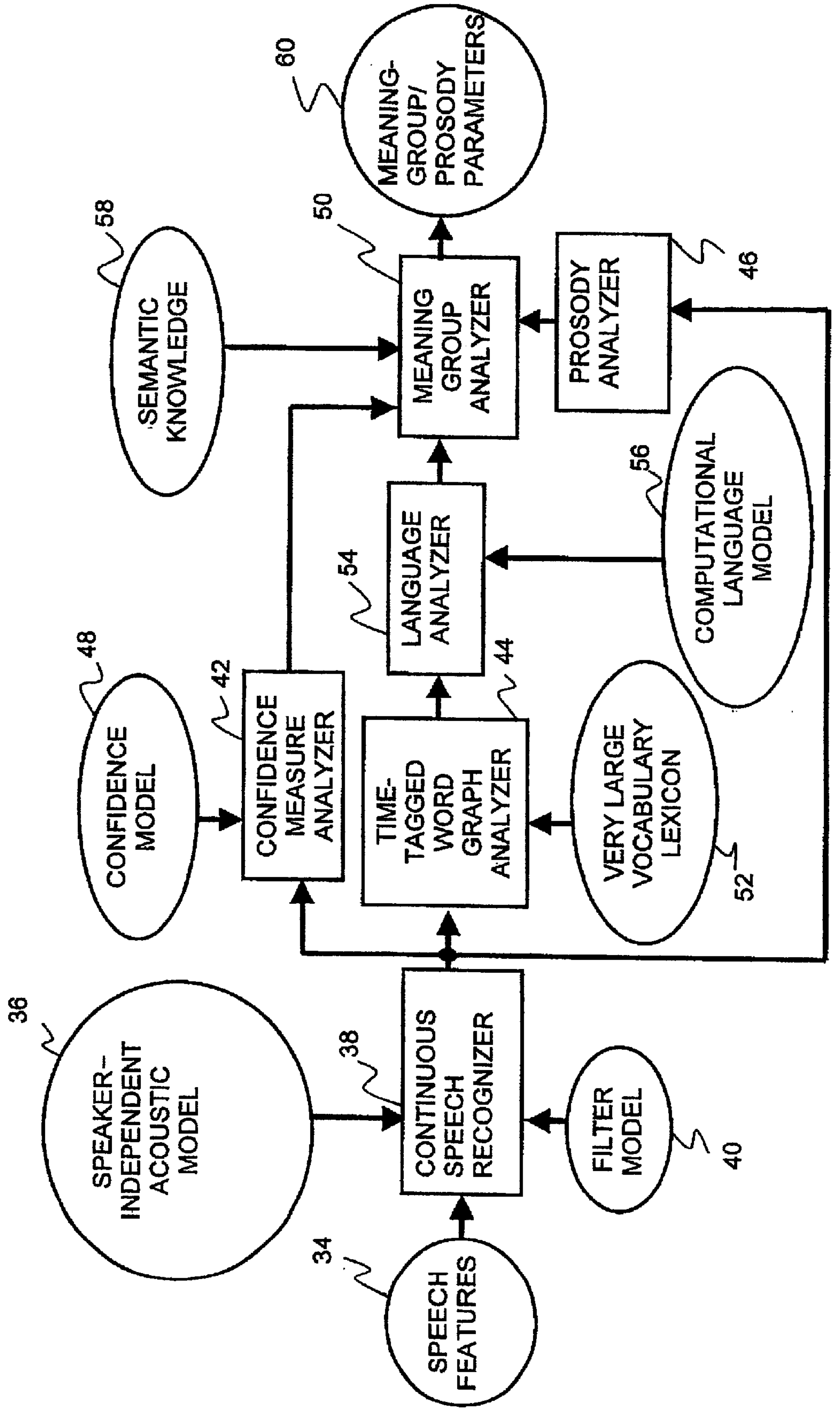
FIG. 2 is a block diagram illustrating the meaning group recognition process of FIG. 1.
Figure 3:
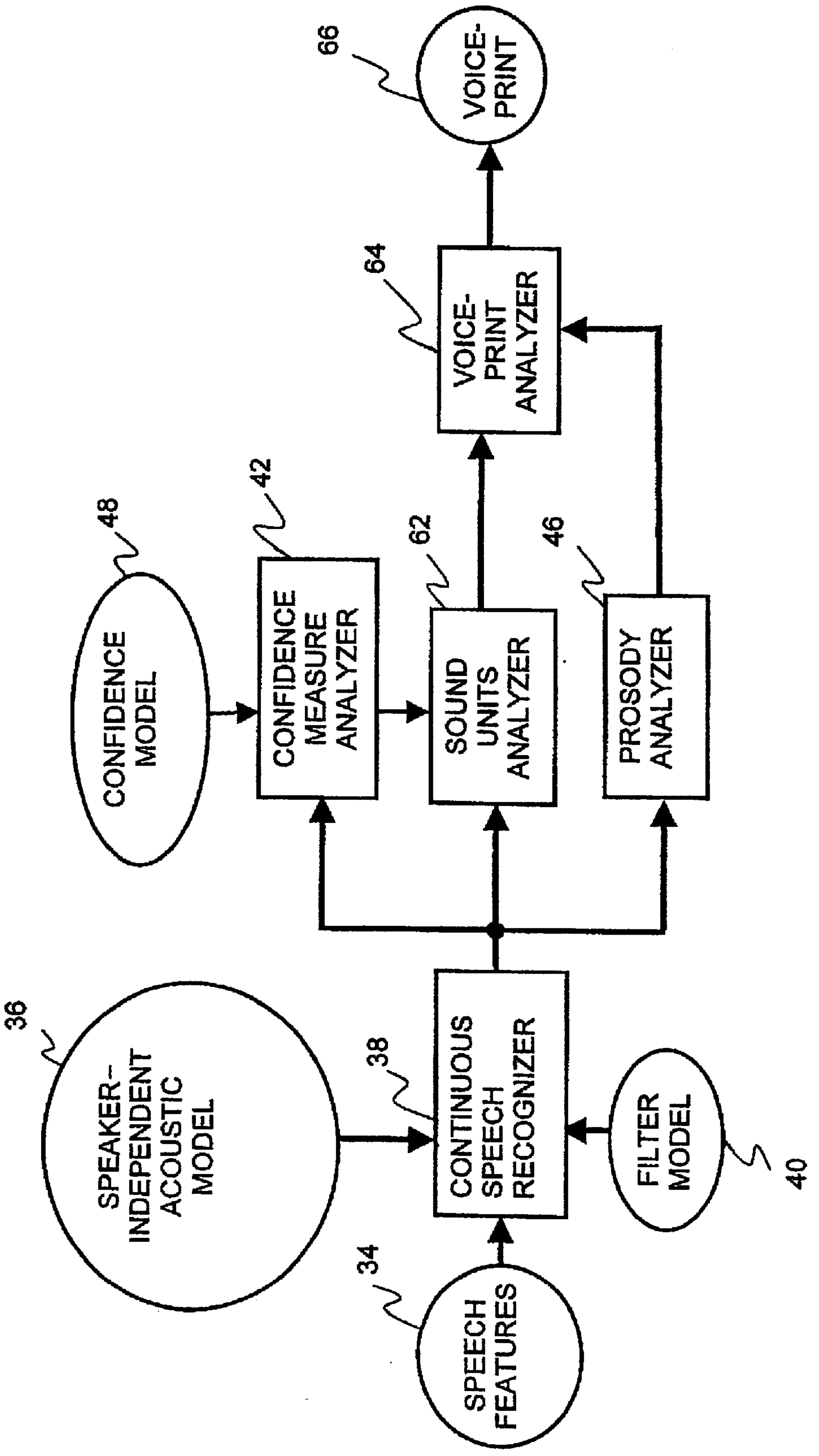
FIG. 3 is a block diagram illustrating the voice-print annotation process of FIG. 1.

With reference to FIGS. 1, 2 and 3, a first embodiment of the invention is described hereinafter. FIG. 1 provides a high-level block diagram illustrating the speech communication system in accordance with the first embodiment of the invention. Although only a simplex speech communication system is shown and described, it will be apparent to one skilled in the art, in view of this disclosure, to arrive at a typically practiced duplex speech communication process. Also, the disclosed speech communication system is provided in accordance with the speech communication of an ideographic language. By doing so, it should not be construed that the invention can only be practiced on such a type of language.

A speaker (not shown) first produces a speech, or a string of words or ideograms. The speech is captured by a transducer such as a microphone (not shown) and converted into a speech signal 10 depicted symbolically by a circle. The speech signal 10 is input to a phone frontend module 12. Using the speech signal 10, the phone frontend module 12 produces spectral parameters and super-segmental parameters of the speech signal 12 by first digitizing the speech signal 12 and subsequently converting the discrete speech signals into the above parameters.

Speech is a time-varying signal, but physical limitations imposed on the production of speech mean that for short periods of time, a speech signal is quasi-stationary. Hence, a single feature vector can be used to represent the speech signal 12 during each of these periods. Preferably, smoothed spectrum analysis by FFT (Fast Fourier Transform) or linear prediction coding (LPC) approaches is used for determining these vectors or spectral parameters. The super-segmental parameters include energy, pitch, duration and voiced/unvoiced parameters, which provide information about the speech signal 12. In particular, the energy parameter provides information about the short-time energy at sample n of the digitized speech signal 12. The short-time energy is the sum of the squares of the N samples $n-N+1$ through n where N is the time length of the speech signal 12. The pitch parameter provides information about the fundamental frequency of the speech signal 12. The duration parameter provides information about the time length of the speech signal 12. The voiced/unvoiced parameters provide information about voiced and unvoiced portions of the speech signal 12.

Sounds in a speech can be classified into two distinct classes according to their modes of excitation. The speaker can produce voiced sounds forcing air through the speaker's glottis with the tension of the vocal cord adjusted so that the vocal cord vibrates in a relaxation oscillation. As a result, this action produces quasi-periodic pulses of air which excite the speaker's vocal tract. The speaker can also produce unvoiced sounds by forming a constriction at some point in the speaker's vocal tract, usually toward the end of the speaker's mouth, and forcing air through the constriction at a high velocity to produce turbulence. This action creates a broad spectrum noise source to excite the speaker's vocal tract.

The spectral and super-segmental parameters are input to a meaning-group recognizer module 14 and a voice-print annotation module 16.

The meaning-group recognizer and voice-print annotation modules 14 and 16 process the parameters into meaning-groups and prosody parameters, and voice-prints, respectively. Hence, by processing the speech of an ideographic language in such meaning-groups for speech communication and subsequently communicating the speech in discrete units according to these meaning-groups, the meaning in each meaning-group, as spoken, can then be maintained throughout the course of the speech communication. The module 14 provides the meaning-groups and prosody parameters as input to a coder module 18, which converts the meaning-groups and prosody parameters into formalized data packages and provides the packages as input to a transmission controller module 20. Prosody parameters include duration, average energy, and average fundamental frequency of meaning groups and individual syllables in the groups.

While receiving the formalized data packages from the coder module 18, the transmission controller module 20 also receives the corresponding voice-prints from the voice-print annotation module 16 via the coder module 18. The coder module 18 prepares the voice print update for transmission. The transmission controller module 20 preferably connects to the Internet 21 and transmits the input received from the voice-print module 16 and the coder module 18 via the Internet 21 to a receiving controller module 22 that is also connected to the Internet 21. The embodiments of the invention can be practised using other frame based networks, such as an Intranet, as well. The Internet 21 is well known to those skilled in the art. The Internet 21 uses FTP (file transfer protocol) as a communication protocol for transferring files. Hence, the transmission controller 20 preferably uses FTP to transmit the formalized data packages and voice-prints received from the coder module 18. During pauses in the speech, the transmission controller 20 intersperses the transmission of the formalized data packages with the transmission of the voice-prints.

Upon receiving from the Internet 21 the formalized data packages interspersed with the voice-prints, the receiving controller module 22 separates the formalized data packages and voice-prints. The receiving controller module 22 provides formalized data packages as input to a decoder module 24. The decoder module 24 converts the formalized data packages into meaning-groups and prosody parameters, while the voice-prints are provided as input to a voice-print update module 26. The voice-print update module 26 extracts voice-print updates from the voice-prints received from the receiving controller module 22 and provides these extractions as input to a meaning-group synthesizer module 28. The voice-print updates assist in providing improved synthesized speech that is more natural sounding and carries the speaker's voice personality. The meaning-group synthesizer module 28 also receives as input the meaning-groups and prosody parameters produced by the decoder module 24.

Using both types of information, the meaning-group synthesizer module 28 applies a high-naturalness and -intelligibility speech synthesizer to produce discrete speech signals. These discrete speech signals are input to a phone backend module 30 for processing into a speech signal 32. A transducer such as an acoustic speaker (not shown) converts the speech signal 32 into speech without a significant discontinuity in each meaning-group of the speech.

Meaning-Group Recognizer Module

The meaning-group recognizer module 14 is described hereinafter in greater detail with reference to FIG. 2. A speaker-independent acoustic model 36, a continuous speech recognizer module 38, and a filter model 40 are described first. The phone frontend module 12 as described hereinbefore produces the spectral parameters and super-segmental parameters as output, collectively known hereinafter as speech features 34. The phone frontend module 12 provides these speech features 34 as input to the continuous speech recognizer module 38. The speaker-independent acoustic and filter models 36 and 40 are also input to the recognizer module 38. The continuous speech recognizer module 38 conducts speech recognition process using the speech features 34 and the discrete speech signal.

Continuous speech recognition is a complex operation. Because of the continuous nature of the speech being processed, the effectiveness of speech recognition depends on a number of issues. Firstly, speech recognition is dependent on the start and end points in the articulation of every word in the continuous speech. As continuous speech largely contains words continuously articulated without pauses, defining the start and end points of an articulated word can be difficult in the presence of any preceding and/or ensuing articulated words. Continuous speech recognition is also dependent on co-articulation, an instance where the production of a syllable or phoneme is affected by the preceding and ensuing syllables or phonemes. Secondly, the rate at which a speaker produces the continuous speech also affects continuous speech recognition. For example, rapidly spoken speech tends to be harder to recognize than more slowly spoken speech. While specific speech recognition methods or techniques are set forth, it will be apparent to one skilled in the art that, in view of the disclosure herein, other methods or techniques can be practiced without departing from the scope and spirit of the invention. For example, the continuous speech recognizer module 36 can be replaced by a non-continuous speech recognizer module, which performs a less complex operation of recognizing words isolated by pauses that occur between adjacent words.

With modeling provided by the speaker-independent acoustic model 36 and the filter model 40, however, the continuous speech recognizer module 38 is capable of addressing the issues associated with continuous speech recognition. The speaker-independent acoustic model 36 provides a speech model as input to the continuous speech recognizer module 38. Preferably, the input is a stochastic speech model, a speech model that is governed only by a set of probabilities, such as the Hidden Markov Model (HMM). The HMM is a finite state machine which can be viewed as a generator of random observation sequences. At each time step, the HMM changes state. The HMM assumes that each successive feature vector or spectral parameter is statistically independent whereas in fact each speech frame is dependent to some extent on the preceding speech frame. Delta parameters, as dynamic coefficients, are preferably used. The delta parameters are preferably calculated as a linear regression over a number of frames or as simple differences. The second differential and delta-delta coefficients are preferably calculated in the same way.

Preferably, the speaker-independent acoustic model 36 is a context dependent phonetic state tied HMM (CDPST-HMM). Accordingly, the acoustic parameters consist of 13 spectrum coefficients with delta and delta-delta parameters. The model is a three state left-to-right HMM model.

The speaker-independent acoustic model 36 enables continuous speech recognition to be effective for all speakers using a particular type of language, e.g. Chinese, American English, or British English. However, a speaker-dependent acoustic model, which is unique to a particular speaker, may replace the speaker-independent acoustic model 36. The modeling provided by a speaker-dependent acoustic model tends to be more accurate in relation to enhancing speech recognition, but does not afford the flexibility of the speaker-independent acoustic model 36.

The continuous speech recognizer module 38 also receives a filter model 40 as input. By providing such a model, the continuous speech recognizer module 38 can refine decisions in relation to voiced/unvoiced parameters and non-speech decisions.

Subsequently, the output of the continuous speech recognizer module 38 is input to a confidence measure analyzer module 42, a time-tagged word graph analyzer module 44, and a prosody analyzer 46. The output includes the super-segmental parameters, which the continuous speech recognizer module 38 receives as input. Preferably, the output additionally includes a list of the best or most likely. sequence of HMM syllable instances consistent with the speech recognition system. Alternatively, the output can additionally include a list of the N-best sequences in order of decreasing likelihood. Further alternatively, the output can additionally include a lattice of the most likely syllable matches.

A confidence model 48 is input to the confidence measure analyzer module 42. In conjunction with the confidence model 48, the confidence measure analyzer module 42 measures the confidence in a word recognition result. That is, the likelihood of a correctly recognized word and/or the likelihood of an unreliably recognized word are estimated according to the confidence models provided by the confidence model 48. The confidence measures are then provided as input to a meaning-group analyzer module 50 that is described hereinafter.

The time-tagged word graph analyzer module 44 operates preferably, in parallel with the confidence measure analyzer module 42. The analyzer module 44 maps the output of the continuous speech recognition module 38 in conjunction with a very large vocabulary lexicon 52. The time-tagged word graph analyzer module 44 maps syllable paths into word paths dependent upon the very large vocabulary lexicon 52. Essentially, the very large vocabulary lexicon 52 defines the recognition syntax and provides the time-tagged word graph analyzer module 44 access to its store of tens of thousands of words so that the HMM syllables or phonemes are mapped into words (i.e. time-tagged word graph). The very large vocabulary lexicon 44 may be replaced with smaller vocabulary lexicons, i.e. from one that stores tens of thousands of words to one that stores thousands of words. The general rule is that size of the vocabulary store compromises the complexity, processing requirements and accuracy of the speech recognition process.

Once the recognized syllables or phonemes are mapped into words, the time-tagged word graph analyzer module 44 provides these mapped words or word lattices as input to a language analyzer 54. In conjunction with a computational language model 56, the language analyzer module 54 searches through thousands of possible sentence hypotheses using the mapped words or word lattice to find an N-best list (N possible sentences) according to the computational language model 56. Such a language model is a statistical language model that consists of a collection of parameters that describe how sentences or word sequences are composed statistically. Typically, the N-gram language model is used where the prediction of a word according to its known history is required. That is, a word can be a unigram (one character), bigram (two character) and so on. Preferably, for n-gram, two histories are treated as equivalent if they end in the same n-1 words.

The language analyzer module 54 thereafter provides the recognized sentences as input to the meaning-group analyzer module 50. The meaning-group analyzer module 50 parses the input into semantic trees for conversion of the input text into meaning-groups. The meaning-group analyzer module 50 also uses the confidence measures produced by the confidence measure analyzer module 42 in this conversion process. A semantic knowledge model 58 that is essentially a semantic dictionary provides the semantic knowledge necessary for the operation.

Semantic knowledge is essentially the understanding of the task domain in order to validate recognized sentences (or phrases) that are consistent with the task being performed, or which are consistent with previously recognized sentences.

As described hereinabove, the output of the continuous speech recognizer module 38 is routed through the time-tagged word graph analyzer module 44, the language analyzer module 54, and the meaning-group analyzer module 50. The output of the continuous speech recognizer module 38 is also provided to the prosody analyzer module 46. The prosody analyzer module 46 then picks out the super-segmental parameters from the input and converts these into prosody parameters. Prosody parameters relate to variations in the speaker's voice tone and emphasis that lend meaning and implication to the speech. The meaning-groups produced by the meaning-group analyzer module 50 and the prosody parameters are then provided as an output 60, input to the coder module 18.

Voice Print Annotation Module

The voice-print annotation module 16 of FIG. 1 is now described in greater detail with reference to FIG. 3. The frontend architecture of the voice-print annotation module 16 is similar to that of the meaning-group recognizer module 14. That is, both modules 14, 16 include the speaker-independent acoustic model 36, the continuous speech recognizer module 38, and the filter model 40 in the same architectural configuration at the frontend to receive the input provided by the phone frontend module 12. Similarly, the continuous speech recognizer modules 38 in both instances provide the same output. For purposes of brevity, the description of module 38 and models 36 and 40 are not repeated here and instead reference is made to the description of FIG. 2 for these features.

The voice-print annotation module 16 also includes the confidence measure analyzer module 42, operating in conjunction with the confidence model 48, and the prosody analyzer module 46. Also, similar to corresponding modules in the meaning-group recognizer module 14, modules 42, 46 are configured as recipients of the output of the continuous speech recognizer module 38. Upon receiving the input, the confidence measure analyzer module 42 processes the input to provide confidence measures to a sound unit analyzer module 62. The prosody analyzer module 46 also processes the input to provide prosody parameters to a voice-print analyzer module 64.

The sound unit analyzer module 62 computes sound unit statistics for amplitude, pitch, and duration parameters of the speech and removes those instances far away from the unit mean. Of the remaining sound unit instances, a small number can be selected through the use of an objective function based on HMM scores. During runtime, the analyzer module 62 dynamically selects the best sound unit instance sequence that minimizes the spectral distortion at the junctures. Since severe prosody modification yields audible distortion, it is possible to keep several unit instances with different pitch and duration. The objective function can be extended to cover sufficient prosodic variation in the unit inventory for each sound unit.

In concatenative speech recognition and synthesis, a relatively small number of sound units are used in conjunction with prosodic alteration rules to cover the vast combinatorial space of all combinations of syllable or phoneme sequences and prosodic contexts that can occur in a language. To determine the sound units needed for the Chinese language, 21 consonants and 35 vowels or vowel-nasal elements are taken into account. However, it will be appreciated that different numbers of elements may be required for other ideographic languages, such as Korean and Japanese. To provide for fluent transition from one syllable or phoneme to the next, syllable or phoneme transition information is appended to syllable or phoneme tails. Any one of 21 consonants or 6 vowels can follow one Chinese syllable or phoneme. Each syllable may contain an initial and will contain a final, as is well known. The initial is a consonant sound and the final is a vowel sound. In the preferred embodiment, 415 combinations of finals and initial/finals were determined by combining all possible initial/finals and then comparing them with combinations found in the Chinese language. Non-used syllables from such possible combinations were removed or eliminated, arriving at the number of 415. Different numbers of combinations may be practiced for the Chinese language without departing from the scope and spirit of the invention. Likewise, different numbers may be practised for other ideographic languages. In this manner of calculation, there are therefore preferably $415*(21+6)=11205$ sound units for the Chinese language, as practised in this embodiment.

After processing, the sound unit analyzer module 62 provides the sound units as input to the voice-print analyzer module 64. The voice-print analyzer module 64 subsequently produces the voice-print of the speaker using the sound units and the confidence measures from the confidence measure analyzer module 42. The voice-print analyzer module 64 then provides the voice-print 66 as input to the transmission controller module 20.

In an initial state of use when the speaker's speech is first communicated to a listener, the meaning-group synthesizer 28 produces a discrete speech signal based on common or default voice-prints. As a result, the phone backend module 30 receives and converts the discrete speech signal into a synthesized speech signal which does not contain much of the speaker's voice personality. As the speaker continues to speak, however, the voice-print annotation module 16 collects and gathers more information about the speaker's personality. The voice-print annotation module 16 is therefore able produce voice-prints that more accurately represent the speaker's voice personality. The voice-print updater module 26 extracts the voice-print updates from these voice-prints that more accurately define the speaker's voice personality, and provides these extractions as input the meaning-group synthesizer module 28. The meaning-group synthesizer module 28, hence, is able to produce a discrete speech signal that leads to more accurately synthesized sounds like the speaker's speech. Over time with further speech samples from the speaker, the improvement in the naturalness of the speaker's voice personality increases.

The coder module 18 is now described in greater detail. The meaning-group recognizer module 14 provides meaning-groups in textual form as input to the coder module 18 and the coder module 18 encodes the input into digital codes. The simplified version of the Chinese language has 6763 characters. Hence, each digital code needs to have at least 13 bits in order for all of the 6763 simplified Chinese characters to be represented by the digital codes.

Coding improves performance because it provides for redundancy. The coder module 18 adds redundant symbols to accentuate the uniqueness of each digital message. Coding also improves performance because it performs noise averaging. The digital codes are designed so that the decoder module 24 can spread the noise, or average out the noise, over long time spans that can become very large.

Codes may be classified into two broad categories. One category of codes is the block codes category where a block code is a mapping of k input binary symbols into n output binary symbols. Consequently, the block coder is a memoryless device. Since $n>k$, the code can be selected to provide redundancy, such as parity bits, which are used by the decoder to provide some error detection and error correction. The codes are denoted by (n,k), where the code rate R is defined by $R=k/n$. The preferred values of R range from ¼ to ⅞, and k range from 3 to several hundred.

The other category of codes is the tree codes category where a tree code is produced by a coder that has memory. Convolutional codes are a subset of tree codes. The convolutional coder accepts k binary symbols at the coder's input and produces n binary symbols at the coder's output, where the n output symbols are affected by $v+k$ input symbols. Memory is incorporated since $v>0$. The code rate is defined by $R=k/n$. Preferred values for k and n range from 1 to 8, and the values for v range from 2 to 60. The preferred range of R is between ¼ and ⅞.

The transmission controller module 20 converts the encoded text into transmission data in accordance with FTP for transmission via the Internet 21 to the receiving controller module 22. The receiving controller module 22 converts the transmission data in the encoded text and provides the encoded text as input to the decoder module 24.

The meaning-group synthesizer module 28, as described hereinbefore, receives as input meaning groups and prosody parameters produced by the decoder module 24. The meaning-group synthesizer module 28 produces a discrete speech signal as a result of processing the meaning-groups and prosody parameters, which the phone backend module 30 receives as input and converts into an analog speech signal.

Speech reproduction can be modeled by an excitation source or voice source, an acoustic filter representing the frequency response of the vocal tract, and the radiation characteristic at the lips, all according to the speaker. Parametric synthesizers are based on the source-filter model of speech reproduction, most notably those applying LPC. Speech synthesis approaches, rule-based and concatenative synthesis, are based on the source-filter model. One major distinction is between rule-based synthesis, where mathematical rules are used to compute trajectories of parameters such as formats or articulatory parameters, and concatenative synthesis, where intervals of stored speech are retrieved, connected, and processed to impose the proper prosody. Preferably, concatenative synthesis is practiced.

Figure 4:
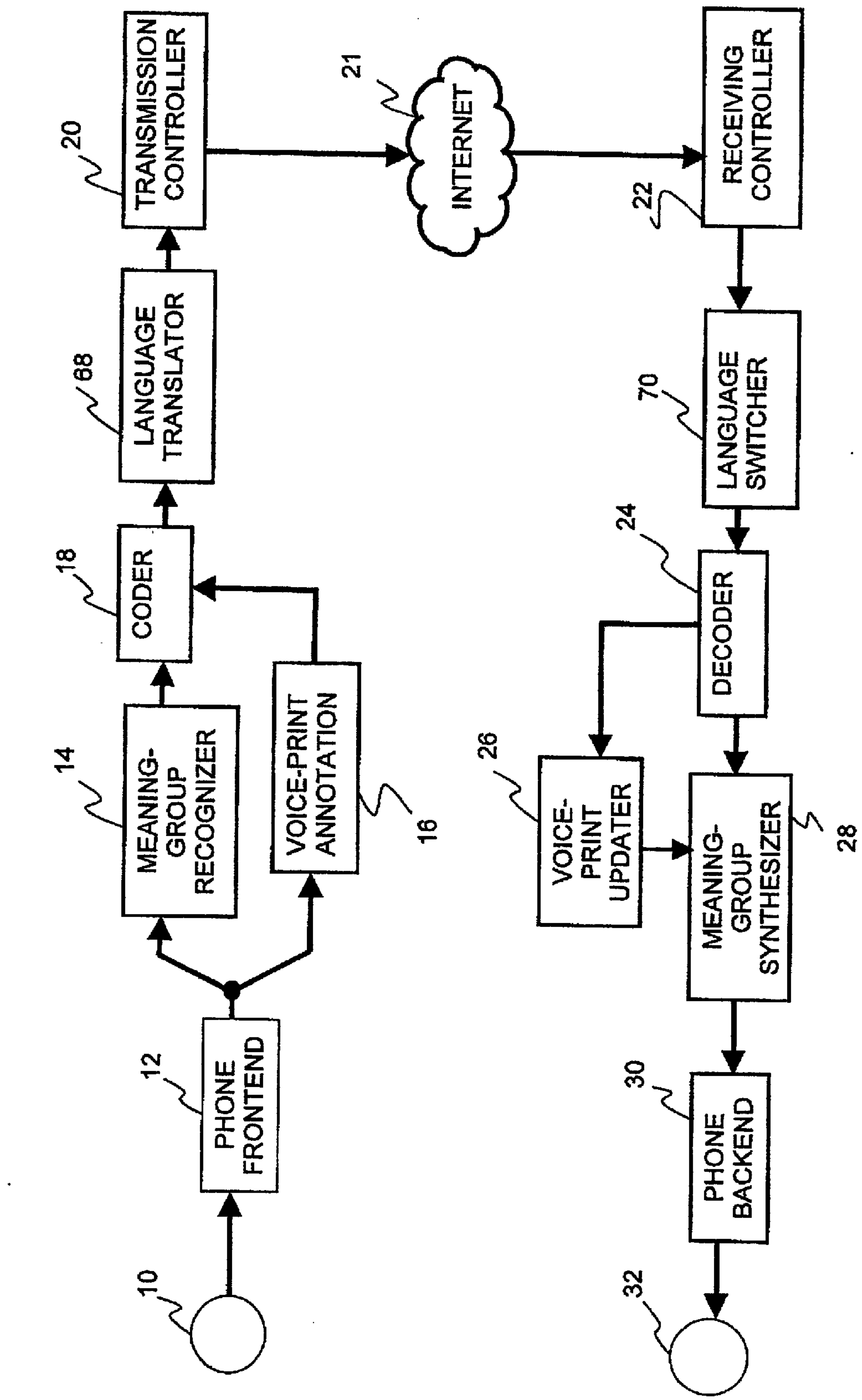
FIG. 4 is a high-level block diagram illustrating the speech communication system in accordance with a second embodiment of the invention.

With reference to FIG. 4, a second embodiment of the invention is now described. FIG. 4 provides a high-level block diagram illustrating the speech communication process in accordance with a second embodiment of the invention. In terms of functionality, the second embodiment provides nearly the same functionality as the first embodiment described above. Therefore, the second embodiment performs nearly the same operations and has nearly the same architecture as the first embodiment. The key difference lies in a language translation capability provided by the second embodiment. That is, the second embodiment provides the capability to translate the speech in the speaker's language into a corresponding speech in the listener's language by including a language translator module 68 and a language switcher module 70. The second embodiment hence performs speech communication in the translated language.

The architecture of the second embodiment includes the architecture of the first embodiment as described above, in addition to the language translator module 68 and the language switcher module 70. In the second embodiment, the language translator is preferably located between the coder 18 and the transmission controller module 20. The language translator module 68 preferably performs a general machine translation function well known to those skilled in the art.

Similarly, the language switcher module 70 is preferably located between the receiving controller module 22 and the decoder module 24 in the second embodiment. The language switcher module 70 switches to the corresponding decoder and meaning-group synthesizer modules 24 and 28 according to a flag set by the language translator module 68. Multiple synthesiser modules 24 and decoders 28 (not shown), each for a specific ideographic language, can be practised.

Figure 6:
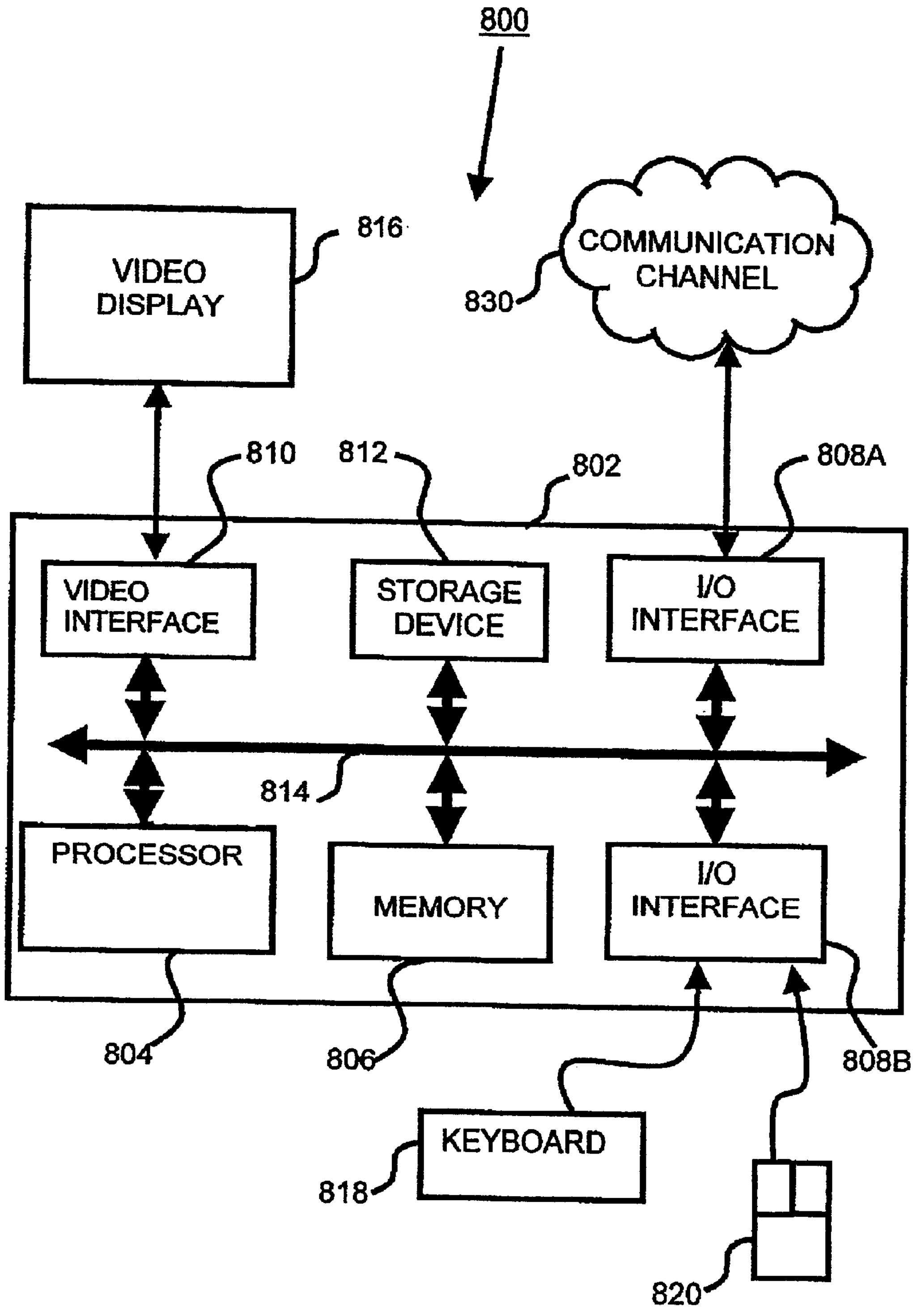
FIG. 6 illustrates a general-purpose computer by which the embodiments of the invention are preferably implemented.

The embodiments of the invention are preferably implemented using a computer, such as the general-purpose computer shown in FIG. 6. In particular, the functionality or processing of the system of FIG. 1 can be implemented as software, or a computer program, executing on the computer. The method or process steps for providing a low data transmission rate and intelligible speech communication are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for providing a low data transmission rate and intelligible speech communication in accordance with the embodiments of the invention.

The system 800 is simply provided for illustrative purposes and other configurations can be employed without departing from the scope and spirit of the invention. Computers with which the embodiment can be practiced include IBM-PC/ATs (TM) or compatibles, one of the Macintosh (TM) family of PCs, Sun Sparcstation (TM), a workstation or the like. The foregoing are merely exemplary of the types of computers with which the embodiments of the invention may be practiced. A typical system 800 includes a casing 802, containing a processor 804, a memory 806, two I/O interfaces 808A, 808B, a video interface 810, a storage device 812 and a bus 814 interconnecting them all. Externally, a video display 816 is connected to the video interface 810, a keyboard 818 and mouse 820 are connected to one I/O interface 808B and other communication channels 830 may be available to the other I/O interface 808A, through a modem or the like. Typically, the processes of the embodiments, described hereinafter, are resident as software or a program recorded on a hard disk drive (generally depicted as block 812 in FIG. 6) as the computer readable medium, and read and controlled using the processor 804. Intermediate storage of the program and speech data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and lntranets including email transmissions and information recorded on websites and the like. The foregoing are merely exemplary of relevant computer readable mediums. Other computer readable mediums may be practiced without departing from the scope and spirit of the invention.

In the forgoing manner, a method, a device, a system and a computer program product for providing a low data transmission rate and intelligible speech communication scheme are disclosed. Only several embodiments are described. However, it will be apparent to one skilled in the art in view of this disclosure that numerous changes and/or modifications can be made without departing from the scope and spirit of the invention.

What is claimed is:

1. A method of processing speech representative of ideograms for speech communication using an asynchronous communication channel, said method including the step of:

processing speech units of a speech and data indicative of said speech units, wherein each speech unit is representative of an ideogram or a plurality of semantically related ideograms and said data indicative of said speech units is discretely communicable on said asynchronous communication channel for providing substantially low data transmission rate and intelligible speech communication.

2. The method according to claim 1, further including the step of processing data dependent on the speech pattern of said speech in relation to one or both of the time and frequency domains, said dependent data communicable on said asynchronous communication channel.

3. The method according to claim 1, wherein said speech processing step includes the step of processing said data indicative of said speech units for transmission on said asynchronous communication channel.

4. The method according to claim 3, wherein said speech processing step further includes the step of performing continuous speech recognition on said speech.

5. The method according to claim 4, wherein said continuous speech recognition step includes the step of using an acoustic model.

6. The method according to claim 3, wherein said speech processing step further includes the step of performing prosody analysis on said speech for providing prosody parameters of said speech, said prosody parameters being communicable on said asynchronous communication channel.

7. The method according to claim 3, wherein said speech processing step further includes the step of parsing sentences in said speech to provide said speech units.

8. The method according to claim 1, wherein said speech processing step further includes the step of processing said data indicative of speech units received from said asynchronous communication channel.

9. The method according to claim 8, wherein said speech processing step further includes the step of synthesizing said speech using said speech units.

10. A method of processing speech representative of ideograms for speech communication using an asynchronous communication channel, said method including the steps of:

processing meaning groups of a speech and data representing said meaning groups, wherein each meaning group is formed from at least one ideogram identifiable by a meaning and said data representing said meaning group is discretely communicable on said asynchronous communication channel; and processing data dependent on the speech pattern of said speech in relation to one of both of the time and frequency domains, said dependent data communicable on said asynchronous communication channel whereby substantially low data transmission rate and intelligible speech communication is provided.

11. The method according to claim 10, wherein said speech processing step includes the step of processing said data representative of said meaning groups for transmission on said asynchronous communication channel.

12. The method according to claim 11, wherein said speech processing step further includes the step of parsing sentences in said speech to provide said meaning groups.

13. The method according to claim 12, wherein said speech processing step further includes the step of performing continuous speech recognition.

14. The method according to claim 13, wherein said continuous speech recognition step includes the step of using an acoustic model.

15. The method according to claim 13, wherein said speech processing step further includes the step of performing prosody analysis on said speech for providing prosody parameters of said speech, said prosody parameters being communicable on said asynchronous communication channel.

16. The method according to claim 10, wherein said speech processing step includes the step of processing said data representative of said meaning groups received from said asynchronous communication channel.

17. The method according to claim 16, wherein said speech processing step further includes the step of synthesizing said speech using said meaning groups.

18. A speech processing device, including:

a speech digitizer for processing a speech in an ideographic language and digitized speech thereof; and a semantic processor for processing said digitized speech by processing speech units representative of an ideogram in said speech or a plurality of semantically related ideograms and data indicative of said speech units which are discretely communicable on an asynchronous communication channel for providing substantially low data transmission rate and intelligible speech communication.

19. The device according to claim 18, further including a speech pattern processor for processing data dependent on the speech pattern of said speech in relation to one of both of the time and frequency domains, said dependent data communicable on said asynchronous communication channel.

20. The device according to claim 19, further including a transmission controller for transmitting said data indicative of said speech units and said data dependent on the speech pattern of said speech.

21. The device according to claim 20, wherein said speech digitizer includes a continuous speech recognizer.

22. The device according to claim 21, wherein said continuous speech recognizer receives input from an acoustic model.

23. The device according to claim 22, wherein said semantic processor includes a prosody analyzer.

24. The device according to claim 23, wherein said semantic processor further includes a sentence parsing means for parsing sentences in said speech to provide said speech units.

25. The device according to claim 19, further including a receiving controller for receiving data indicative of said speech units and said data dependent on said speech pattern of said speech.

26. The device according to claim 25, wherein the semantics processor includes a speech synthesizer for synthesizing said speech using said speech units and said data dependent on said speech pattern of said speech.

27. A speech communication system for an asynchronous communication channel, including:

a speech processing device for processing a speech in an ideographic language and digitized speech thereof by processing speech units representative of an ideogram in said speech or a plurality of semantically related ideograms and data indicative of said speech units which are discretely communicable; and a communication controller for communicating said speech information on said asynchronous communication channel for providing substantially low data transmission rate and intelligible speech communication.

28. The system according to claim 27, further including a speech pattern processor for processing data dependent on the speech pattern of said speech in relation to one of both of the time and frequency domains, said dependent data communicable on said asynchronous communication channel.

29. The system according to claim 28, wherein said communication controller includes a transmission controller for transmitting said data indicative of said speech units and said data dependent on the speech pattern of said speech.

30. The system according to claim 29, wherein said speech processing device includes a continuous speech recognizer.

31. The system according to claim 30, wherein said continuous speech recognizer receives input from an acoustic model.

32. The system according to claim 31, wherein said speech processing device further includes a prosody analyzer.

33. The system according to claim 32, wherein said speech processing device further includes a sentence parsing means for parsing sentences in said speech to provide said speech units.

34. The system according to claim 28, wherein said communication further includes a receiving controller for receiving data indicative of said speech units and said data dependent on said speech pattern of said speech.

35. The device according to claim 34, wherein said speech processing device includes a speech synthesizer for synthesizing said speech using said speech units and said data dependent on said speech pattern of said speech.

36. A computer program product for processing speech for communication on an asynchronous communication channel, including:

a computer usable medium having computer readable program code means embodied in said medium for causing the processing of speech representative of ideograms for speech communication, said computer program product having:

computer readable program code means for processing speech units of a speech and data indicative of said speech units, wherein each speech unit is representative of an ideogram or a plurality of semantically related ideograms and said data indicative of said speech units is discretely communicable on said asynchronous communication channel for providing substantially low data transmission rate and intelligible speech communication.

37. The computer program product according to claim 36, further including computer readable program code means for processing data dependent on the speech pattern of said speech in relation to one or both of the time and frequency domains, said dependent data communicable on said asynchronous communication channel.

38. The computer program product according to claim 36, wherein said computer readable program code means for processing includes means for processing said data indicative of said speech units for transmission on said asynchronous communication channel.

39. The computer program product according to claim 36, further including computer readable program code means for parsing sentences in said speech to provide said speech units.

40. The computer program product according to claim 39, further including computer readable program code means for synthesizing said speech using said speech units.

* * * * *